June 11, 1935.　　　J. H. STEENSON　　　2,004,398
TIE ROD CONSTRUCTION
Filed July 23, 1932　　　2 Sheets-Sheet 1
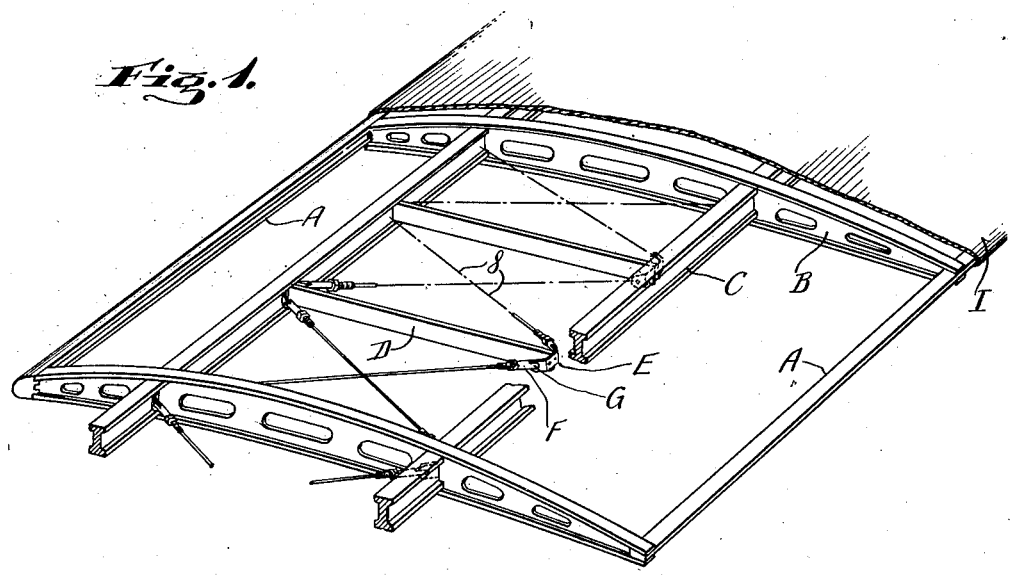
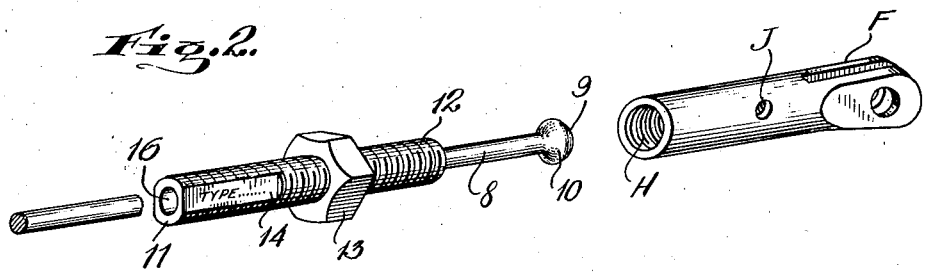
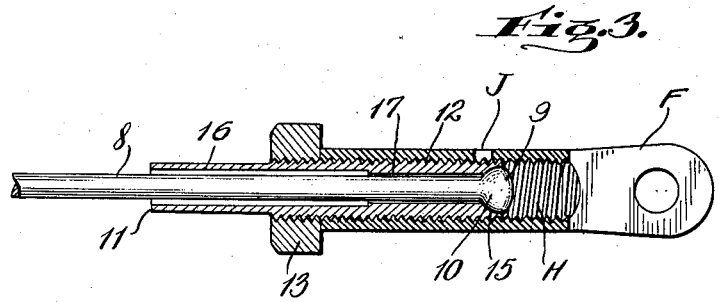
INVENTOR.
JAMES H. STEENSON
BY C. C. Cousins
ATTORNEY

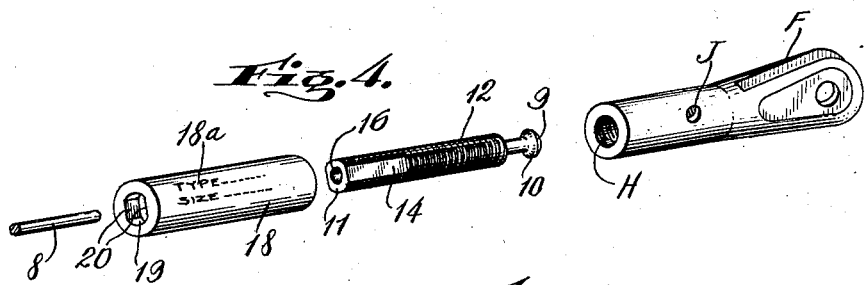
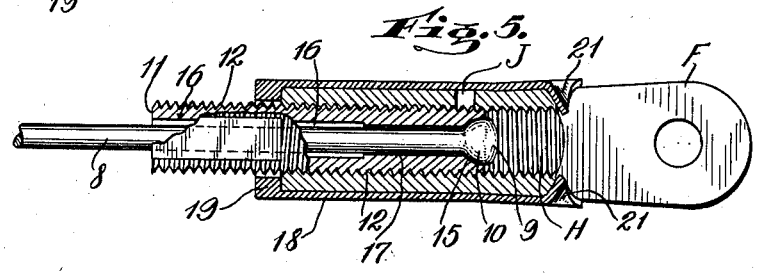
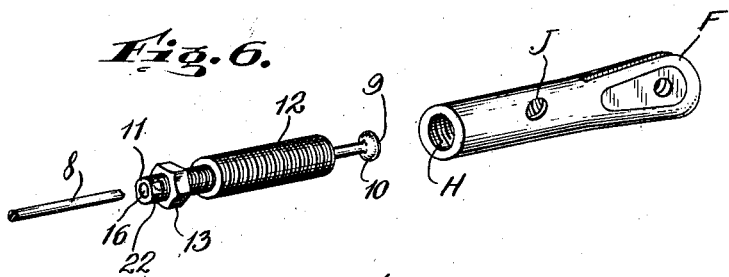
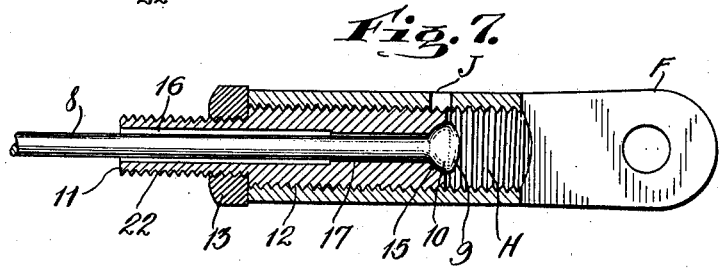

Patented June 11, 1935

2,004,398

UNITED STATES PATENT OFFICE 2,004,398

TIE ROD CONSTRUCTION

James H. Steenson, Plainfield, N. J., assignor to Breeze Corporations, Inc., Newark, N. J.

Application July 23, 1932, Serial No. 624,321

6 Claims. (Cl. 287—62)

This invention relates to tie rod construction and the object is broadly to provide a construction which is effective under conditions of extreme vibration and varying stresses by reason of tension and/or compression.

Where tie rods are not of uniform cross section fatigue and other stresses are localized at points where the areas in cross section are reduced and resultant breakage occurs. Therefore, one of the objects of the invention is to provide a construction which eliminates this localization of fatigue and other stresses, and at the same time permits the vibration actually set up in the use of a tie rod.

In the use of tie rods the stresses are frequently varied so that the tension load on the rod is changed to a compression load. This frequently results in distortion of the tie rod. Therefore, one object of the invention is to provide a construction which will eliminate this condition and to provide a construction which will permit a change of tension loads on the tie rod and to prevent imposition of compression loads, and at the same time which will avoid distortion of the rod by reason of compression.

In tie rods constructed with screw threaded ends, made up in stock sizes, in order to modify the length of the rod the structure must be modified. For instance, where there is the usual square tie rod with screw threaded areas at its ends the screw threaded ends would have to be cut off and the ends re-formed and screw-threaded. This has proved unsatisfactory and has resulted in the accumulation of large stocks of unsuitable tie rods which ultimately have to be scrapped, resulting in large losses. Therefore, one object of this invention is to provide a construction in which the length may be modified without modifying the body structure of the rod.

A further object of the invention is to provide a visible indication which will effectively show that the required minimum engagement of the rod to its connecting clevis has been effected, so as to eliminate any danger that sufficient engagement has not been made in assembling and servicing the parts.

A further object of the invention is to provide a construction where a threaded adjusting member has its material at the root of its thread under compression instead of under tension.

A further object of the invention is to provide a construction in which the lock nut does not impose any load directly on the tie rod and in which the rod does not have to be rotated to install or service the same.

In some of the arts tie rods and their connections are made up in large stocks, of varying materials and dimensions, and it is necessary to distinguish betwen them. Therefore, one object of the invention is to provide a means for receiving indicia clearly applied to the rod and combined with a locking means which may be easily applied and removed.

A further object of the invention is to provide a tie rod in which no tension is applied to any threaded part on the rod and to have the rod of uniform cross section from end to end.

Another object of the invention is to provide a tie rod with spherically formed ends which may be seated in correspondingly spherically formed seats of an adjustably connecting head so as to eliminate the possibility of imposing eccentric loads on the spherically formed ends of the rod which loads may be caused by vibration or deflection of varying amplitudes.

A further object of the invention is to provide a construction for adjustment between the screw threaded connecting members of the tie rod of such design and proportion as to eliminate the possibility of the exchanging of the tension for a compression load, and at the same time embody a shear value of the screw threads under strain which greatly exceeds that provided in designs now in general use.

A further object of the invention is to provide a construction which may be installed, inspected, adjusted and replaced by single individual or workman, particularly in airplane practice. Under ordinary practice airplane tie rods are made angular in cross section and have screw threaded ends. These screw threaded ends engage in interiorly screw threaded sleeves of a clevis at each end. The screw threaded ends are respectively provided with right and left screw threads, and installation of such latter tie rods requires two men to hold the rod in position to be installed and to tighten the ends to provide the necessary tension, and when the load is changed from a tension to a compression load the rod is necessarily distorted. Therefore, one of the objects of the invention is to avoid this undesirable condition.

In the drawings forming part of this application I have illustrated the application of the invention to airplane construction, but it will be understood that the object of the invention is to provide a construction applicable to any condition where a connecting member is subjected to tension or by variation to compression, and where the loads are of varying values.

The invention consists of the construction, combination and arrangement of parts, as herein illustrated, described and claimed.

In the accompanying drawings, forming part hereof, is illustrated a form of embodiment of the invention, as applied to airplane construction, in which drawings similar reference characters designate corresponding parts, and in which:

Figure 1 is a perspective, partly broken away, showing the application of the invention to an airplane wing;

Figure 2 is a perspective showing the parts of one end of a tie rod and its connections, separated;

Figure 3 is a longitudinal section through the connecting parts and showing one end of a tie rod in elevation, the parts being shown in their relative assembled position;

Figure 4 is a perspective view showing the parts separated and illustrating the removable means for locking the parts together without the use of a lock-nut, and providing a means for carrying indicia in connection with the locking means;

Figure 5 is a longitudinal section of the parts illustrated in Figure 4, but in assembled arrangement;

Figure 6 is a perspective showing the parts separated and illustrating a modified means for indicating a required minimum engagement of the screw threaded parts; and, Figure 7 is a longitudinal section through the parts illustrated in Figure 6 assembled in their relative working condition.

Referring to the drawings, A designates the longitudinal frame members of an airplane wing which are connected by transverse ribs B. Carried by and connecting the ribs B are spars C between which are disposed compression bars D. Secured to the spars C at intervals are fittings E adapted to receive the ends of the compression bars D. Secured to each free end of each of the fittings E is a clevis F removably secured in position by means of a pin G. The clevis F is provided with an internal screw threaded sleeve H in each instance and the wing is covered by a fabric covering I. Ordinarily to indicate the depth of the tie rod in the sleeve H an opening J is provided in the wall of the sleeve H to permit the insertion of a wire or other small instrument so as to indicate when a required minimum engagement between the parts has been obtained.

In ordinary construction the tie rod itself is usually an angular metal body having its ends round in cross section and provided with screw threads.

All of the foregoing construction designated by letters is old and well known in the art and is described merely to show the application of the invention.

Referring to the drawings and to illustrate one form of my invention, 8 designates a tie rod, preferably round in cross section and uniform in cross section throughout its entire length so that any stress applied thereto will not be localized in any portion of less cross section than its adjacent body. As disclosed, the object of this is to increase the factor of safety against breakage under stress.

On each end the rod 8 is provided with an integral head 9 formed by upsetting the metal of the body of the rod 8, and the inner face of the head 9 is formed with a face 10 spherical in contour and gradually merging into the body of the rod 8 so as not to leave any abrupt edge in cross section, thus again eliminating localization of stress and increasing the factor of safety from breakage, and eliminating the possibility of imposing an eccentric load on the heads due to vibrations or deflections when used in connection with a corresponding spherical bearing hereinafter described.

At the time of manufacture of the rod 8 there are disposed thereon two sleeves 11, one for each end of the rod. The sleeve 11 is provided with external screw threads 12 adapted to engage the internal screw threaded sleeve H of the clevis F. The screw threads 12 perform the additional function of receiving the lock nut 13, the threads of the sleeve H and the threads 12 of the sleeve 11 and the threads of the lock nut 13, all being uniform effects a material reduction in the cost of production.

For a portion of its length the sleeve 11 is provided with flattened or angular surfaces 14. These surfaces are designed to be engaged by a suitable turning tool or instrument, such as a wrench and to perform the additional function that when the sleeve 11 has been screwed into the sleeve H to a point where the inner ends of the flattened surfaces 14 register with the outer end of the sleeve H, the workman has automatically indicated to him that the required or sufficient minimum engagement of the threads of the parts has been attained so that the assembly of the parts is made "fool proof", and the factor of safety requisite is obtained. It is known in the art to have the opening J in the sleeve H and to use an instrument as a probe to ascertain whether the rod 8 has been brought into sufficient engagement, but the flattened surfaces 14 give this indication automatically.

The outer ends of the sleeves 11 are each provided with a recess or socket 15, coincident in size and radius with the inner faces 10 of the members 9, so that the loads of the stresses imposed on the rod 8 are equally distributed to the end of the sleeve 11, and avoids imposing of eccentric loads due to varying vibrations or deflections.

The inner ends of the sleeves 11 are each provided with a bore 16 and the outer ends are provided with a continuing bore 17 of less diameter. The rod 8 is disposed through these bores and, as is well known in use, its vibrations increase from the focal point in the center of the head 10 to a point midway its ends. The bore 16 is made larger to permit this vibration and the bore 17 is made smaller so as to check excessive vibration immediately adjacent the ends.

In the construction shown in Figures 4 and 5 the lock nut 13 is eliminated and for it is substituted a sleeve of substantially soft metal 18 adapted to be slid over the sleeve 11 after it has been secured in the desired minimum engagement with the sleeve H.

The outer end of the sleeve 18 may be upset to form ears 21 to engage between the walls of the slot of the clevis F to retain the sleeve 18 in position and against rotation. The inner end of the sleeve 18 is provided with a flange 19, the bore of which is provided with angular faces 20 adapted to engage the angular faces 14 of the sleeve 11 and to maintain the sleeve 12 locked against rotation after it has been adjusted to the desired relationship to the sleeve H.

With the use of the sleeve 18 the flattened surfaces 14 of the sleeve 11 may be covered so that indicia of size and dimension is not readily observable for the purpose of inspection so that indicia 18a for that purpose may be imposed on the sleeve 18, so that the sleeve 18 performs a triune function, to wit, effects a locking of the parts together, indicates a required minimum engagement of the parts and affords a medium for indicia.

In the form of construction in Figures 6 and 7 the sleeve 11 has its screw threads 12 of a length required to effect a minimum engagement in order to provide the proper factor of safety so that when it is engaged in the sleeve H to a point where the shoulder formed by its reduced screw threaded end 22 is even with or inside of the end of the sleeve H it automatically indicates the proper adjustment of the parts. Further, by having the reduced screw threaded end 22 a reduction of weight is effected in the part and a smaller and lighter lock nut 13 may be used, which is desirable in all parts of airplane construction where the factor of safety is not lowered.

The operation of the parts and the physics involved will be apparent from the foregoing disclosure, and the objects attained obvious to those skilled in the art to which the invention appertains.

In using the invention the rod or wire 8 is produced with a uniform cross-section throughout. The rod 8 is introduced through the sleeves 11 and in the instance of the construction shown in Figures 4 and 5, through the sleeves 18. This in itself produces a complete article of manufacture.

To install the device the sleeve 11 is introduced into the sleeve H to the point where the end of the flattened portion 14 registers with the end of the sleeve H, and the lock nut 13 is tightened to secure the parts.

In the form shown in Figures 4 and 5 the lock nut 13 is dispensed with and the sleeve 18 performs the function of the nut, the ears 21 holding same against rotation. In all of the forms the surfaces 14 or the reduced portion 22 (Figures 6 and 7) indicate the required minimum engagement of the parts.

For inspection it is necessary to remove only a limited area of the fabric I and a single workman may make the installation or adjust the tension on the rod 8.

It is apparent that when the load on the rod 8 is reversed from tension to compression that the rod will slide through the sleeve 11 and will not be distorted.

It will also be apparent that the rod 8 being of comparatively small cross section has no screw threads but is held by its spherical head co-acting with the spherical seat in a sleeve having a large screw threaded area, thus insuring an excess of shear resistance,—and increasing the factor of safety, and reducing production costs.

It will also be apparent that the construction is "fool proof" in indicating the required minimum of engagement of the screw threaded connecting parts.

Having thus fully described the invention, what is claimed as new and desired to be secured by Letters Patent of the United States is:

1. A tie rod construction for aircraft use comprising, in combination, a rod of uniform cross section having a rounded head, a clevis having a threaded bore to receive the rod, an exteriorly threaded sleeve disposed around the rod to engage in the bore of the clevis, said sleeve having a bore of one diameter for a portion of its length and of a different diameter for another portion of its length, the walls of the different portions of the bore being parallel and a curved seat to receive the rounded head, and a locking means carried by the sleeve to engage the clevis to lock the clevis and sleeve together.

2. A tie rod construction for aircraft use comprising, in combination, a rod of uniform cross section having a head, a clevis having a threaded bore to receive the rod, an exteriorly threaded sleeve disposed around the rod to engage in the bore of the clevis, said sleeve having a bore of one diameter for a portion of its length and of a different diameter for another portion of its length, the walls of the different portions of the bore being parallel and said sleeve having flat portions on the outside to indicate a required engagement between the sleeve and the clevis and a lock nut on the sleeve to bear against the clevis to lock the parts together.

3. A tie rod construction for aircraft use comprising, in combination, a rod of uniform cross section having a head, a clevis having a threaded bore to receive the rod, an exteriorly threaded sleeve disposed around the rod to engage in the bore of the clevis, said sleeve having flat portions on the outside to indicate a required engagement with the clevis and a locking means to lock the sleeve and clevis together comprising a tubular member to surround the sleeve and engage the clevis, said tubular member having angular faces to engage the flat portions on the sleeve.

4. A tie rod construction for aircraft use comprising, in combination, a rod of uniform cross section having a head, a clevis having a threaded bore to receive the rod, an exteriorly threaded sleeve disposed around the rod to engage in the bore of the clevis, said sleeve having flat portions on the outside to indicate a required engagement with the clevis and a locking means to lock the sleeve and clevis together comprising a tubular member to surround the sleeve and engage the clevis, said tubular member having angular faces to engage the flat portions on the sleeve, and having ears adapted to be upset after the structure is assembled to lock the tubular member to the clevis.

5. A tie rod construction for aircraft use comprising, in combination, a rod of uniform cross section having a head, a clevis having a threaded bore to receive the rod, an exteriorly threaded sleeve disposed around the rod to engage in the bore of the clevis, said sleeve having a reduced portion to indicate a required engagement with the clevis and a lock nut on the reduced portion to lock the parts together.

6. A tie rod construction for aircraft use comprising, in combination, a rod of uniform cross section having a rounded head, a clevis having a threaded bore to receive the rod, an exteriorly threaded sleeve disposed around the rod to engage in the bore of the clevis, said sleeve having a bore of varying size and a curved seat to receive the rounded head, and said sleeve having a reduced portion to indicate a required engagement with the clevis and a lock nut on the reduced portion to lock the parts together.

JAMES H. STEENSON.